No. 830,341. PATENTED SEPT. 4, 1906.
A. LINDGREN.
PLOW.
APPLICATION FILED DEC. 27, 1904.
3 SHEETS—SHEET 1.
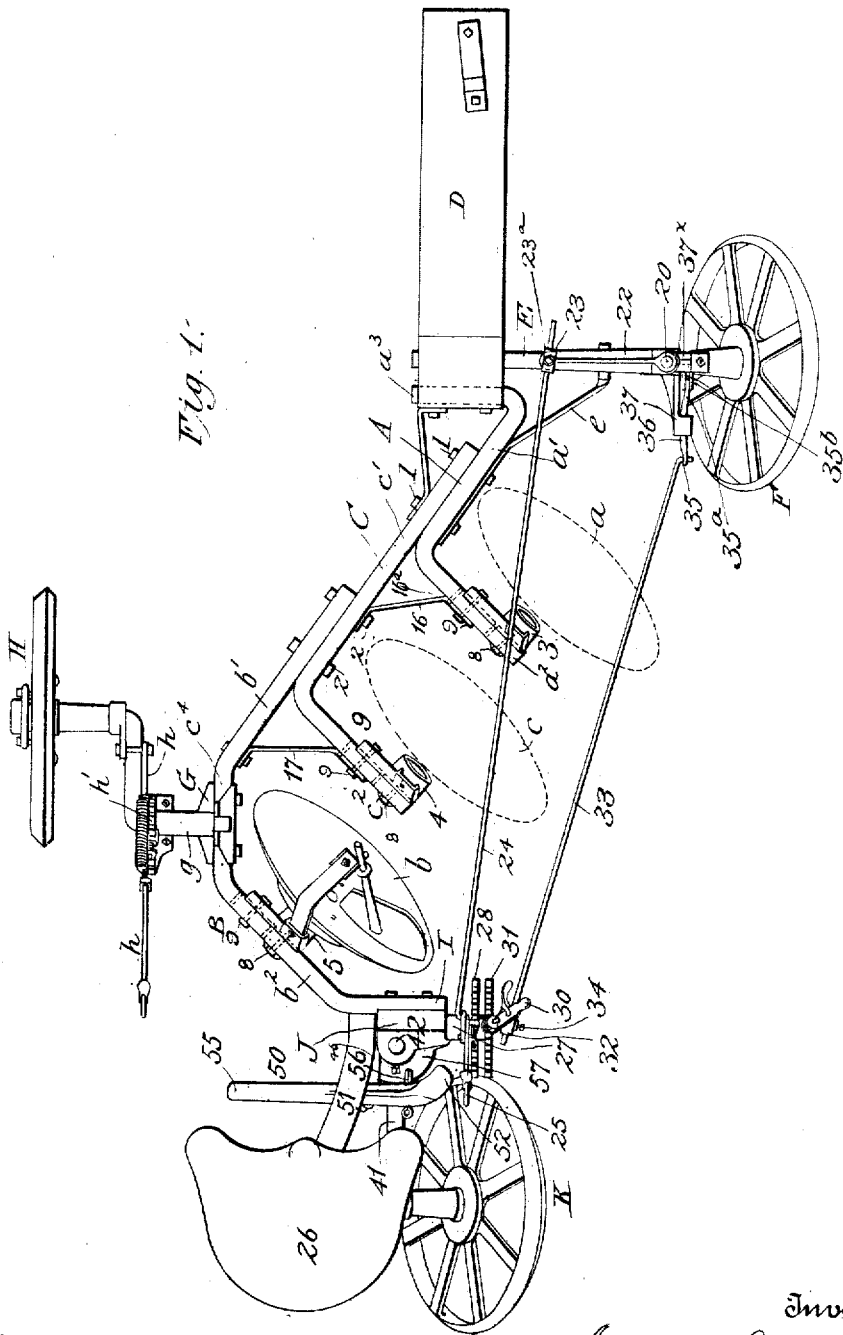
Witnesses
Inventor
August Lindgren
by P. T. Dodge
Attorney

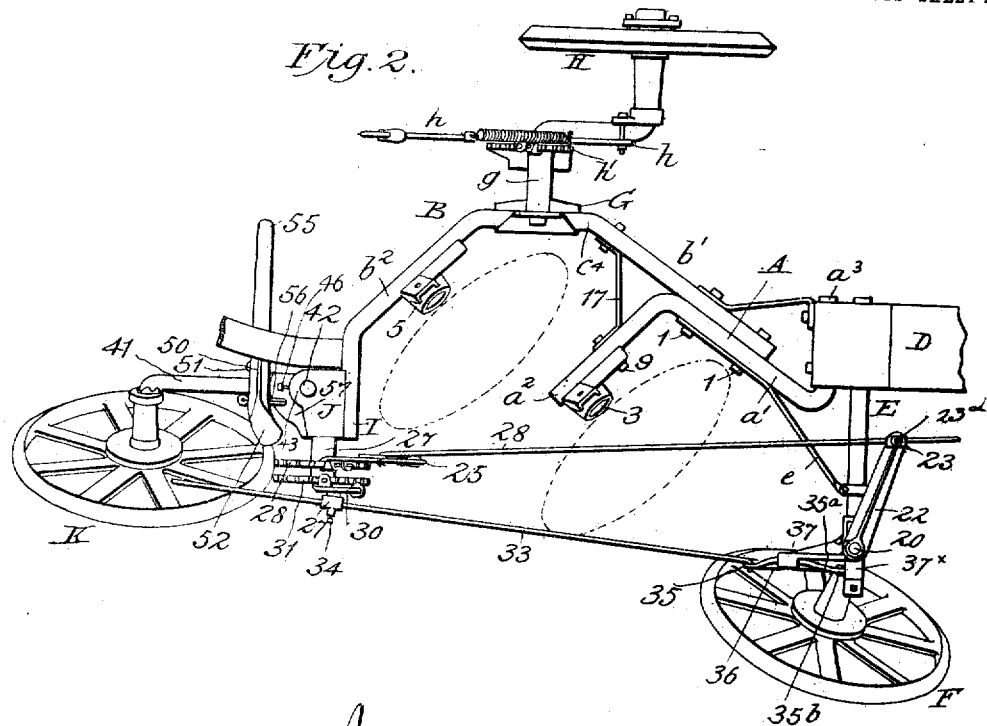
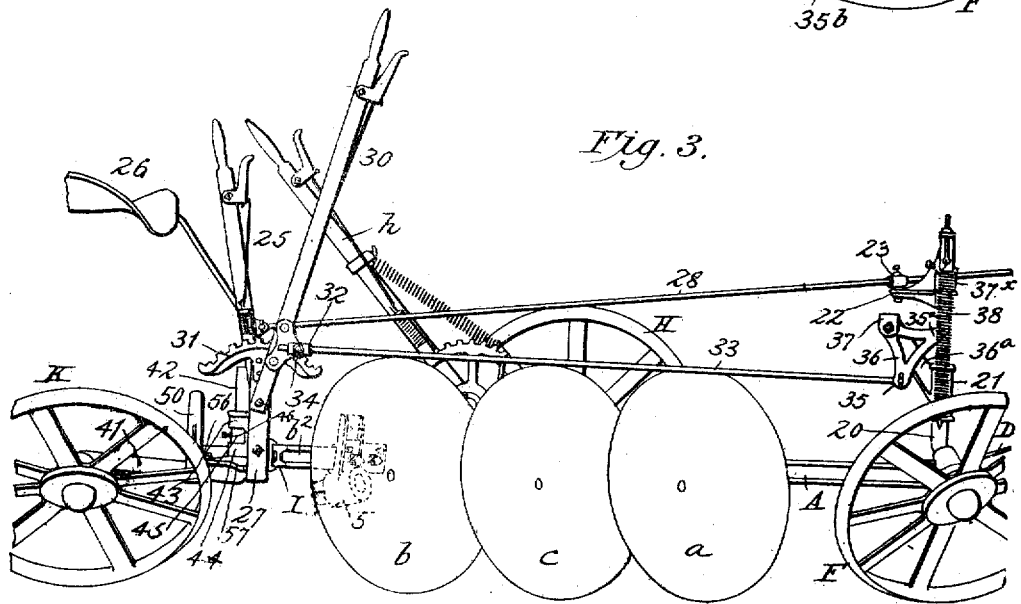

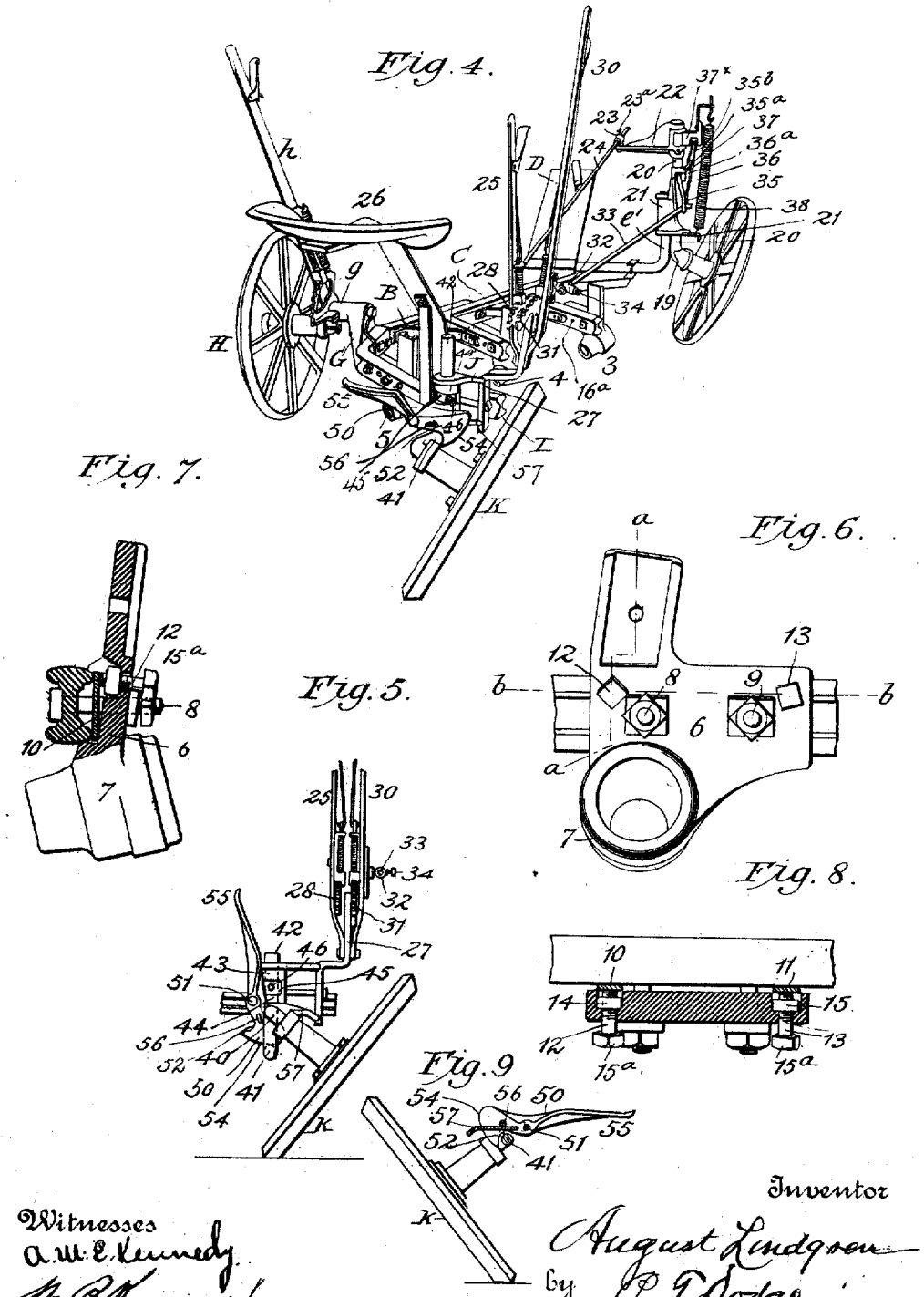

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

PLOW.

No. 830,341.   Specification of Letters Patent.   Patented Sept. 4, 1906.

Application filed December 27, 1904. Serial No. 238,395.

*To all whom it may concern:*

Be it known that I, AUGUST LINDGREN, of Moline, county of Rock Island, and State of Illinois, have invented a new and useful Improvement in Plows, of which the following is a specification.

This invention relates to plows, and has reference more particularly to the type of plow in which a wheeled frame is equipped with one or more plowing-disks.

The invention consists in various improvements directed to the form and construction of the frame to adapt the machine to be converted into a "single-disk," a "double-disk," or "triple-disk" plow; to the mechanism for raising, lowering, and controlling the front furrow-wheel; to the mechanism for raising, lowering, and controlling the rear furrow-wheel; to the means for effecting the adjustments of the disks, and to various other features of construction, which will be fully described in the specification and pointed out in the claims.

In the accompanying drawings, Figure 1 is a top plan view of my improved machine with the members of the frame connected and assembled for a three-disk plow. Fig. 2 is a similar view showing the frame converted into a two-disk plow. Fig. 3 is a side elevation of the improved machine as viewed from the furrow side. Fig. 4 is a rear perspective view showing the normal operative position of the rear furrow-wheel. Fig. 5 is an end view showing the furrow-wheel raised for transportation. Fig. 6 is a front elevation of one of the disk-bearings. Fig. 7 is a vertical section through the same on the line $a\ a$. Fig. 8 is a horizontal longitudinal section on the line $b\ b$. Fig. 9 is a transverse vertical sectional elevation on the line 9 9 of Fig. 2 as viewed in the direction of the arrows on said line, showing how the latch for the rear caster-wheel is held free of the stem of said wheel and out of contact with the same.

Referring to the drawings, as shown particularly in Figs. 1, 2, and 3, the frame of the machine comprises a plurality of complementary detachable frame members or sections—in the present instance three in number, a forward one, A, a rear one, B, and an intermediate one, C—the said sections being of such form that they are adapted to be detachably connected together in the order shown—that is, with the intermediate section connected directly to the front section and the rear section connected directly with the intermediate section, or the intermediate section may be omitted and the rear section connected directly with the front section. The several frame-sections are adapted also to carry each a plowing-disk, a disk $a$ for the front section, a disk $b$ for the rear section, and a disk $c$ for the intermediate section. In order to adapt the several sections to be thus assembled and to carry its plowing-disk, each section embodies a draft portion and a disk-carrying arm, the latter being arranged at an angle with reference to the draft portion. The draft portion of the member A is indicated at $a'$ and the disk-carrying arm at $a^2$, the draft portion of the member C is indicated at $c'$ and the disk-carrying arm at $c^2$, and the draft portion of the member B is indicated at $b'$ and the disk-carrying arm at $b^2$.

The relation and form of the draft portions of the several members are such that in their different positions when they are connected together they will extend at an inclination with reference to the line of draft, as indicated by the dotted line, Fig. 1, the disk-carrying arms of the several members extending parallel to each other laterally rearward, and the disks carried by them thus overlapping in the usual manner and each turning a furrow furrowward of the next disk in advance.

In the arrangement of the parts as indicated in Fig. 1, with the frame members connected to carry three disks, the front and rear disks are respectively on opposite sides of the line of draft through the tongue D, so that the strain on the frame due to the resistance offered the passage of the disks through the ground is evenly distributed on opposite sides of the frame as a whole, which will tend to avoid the crowding of the machine laterally.

I prefer to form the several frame-sections of a length of metal bar of substantially I form in cross-section bent to the desired form.

The front frame-section A is provided at its forward extremity with a laterally-extending arm $a^3$, disposed at right angles to the line of draft, to which the tongue D is attached, and in front of this arm the tongue has connected with it a horizontal laterally-extending bar E, braced from the frame member A by a diagonal brace $e$, connected with the draft portion of said member and with the bar E, near its outer end, which latter is upturned, as at $e'$, and gives support to the front furrow-wheel F, as will be more fully described hereinafter.

The intermediate frame-section C has the forward end of its draft portion placed flatly against and is detachably connected with the rear end of the section A by means of fastening-bolts 1, passed through said parts from the inside, which bolts have fastening-nuts applied to their ends.

The rear frame-section B has the forward end of its draft portion placed flatly against the rear end of the section in advance, to which it is connected by means of fastening-bolts 2, passed through said parts and provided with suitable fastening-nuts.

Between the draft portion of the section C and the disk-carrying arm $b^2$ said section extends longitudinally in the direction of the line of draft, as at $c^4$, and to this longitudinally-extending portion of the frame is attached an upwardly-extending bracket G, provided with a lateral bearing $g$, in which is mounted the inner end of a crank-axle having on its outer end a land-wheel H, the axle having fixed to it an adjusting-lever $h$, provided with a locking-dog engaging a toothed segment $h'$, fixed to the bearing. Extending laterally furrowward from the end of the disk-carrying arm $b^2$ is a horizontal arm I, to which is firmly attached a block or casting J, in which is mounted the rear furrow-wheel K, as will be more fully described hereinafter.

The bearings for the several disks are indicated, respectively, by the numerals 3, 4, and 5, and each comprises a vertical bracket-plate 6, Figs. 6 and 7, adapted to be secured to the front of the disk-carrying arm, and an upwardly-inclined cylindrical bearing proper, 7, to receive the hub of the disk, which bearing is fixed to the lower end of the bracket-plate, with its axis below the carrying-arm and extending obliquely upward and laterally at an angle with respect to the line of draft.

The bracket-plates are secured to the carrying-arms of the several sections in such manner that they may be adjusted laterally along the arms and may also be tipped to vary the "dip" or inclination of the disks.

The lateral adjustment of the bearing is effected by providing the carrying-arms with a number of holes arranged side by side to receive fastening-bolts 8 and 9, extending through the bracket-plate and the openings in the arms and serving to secure the plate firmly but detachably to the arm, the position of the plate on the arm being changed by setting the fastening-bolts in different holes.

The tilting of the bracket-plates in order to change the inclination or dip of the disks is effected by setting in between the inner face of the bracket-plate and the side of the carrying-arm two vertical bearing-plates 10 and 11, which rest against the upper and lower projecting edges of the arm and which are engaged at their upper ends by two set-screws 12 and 13, extending loosely through the bracket-plate and having their inner ends threaded through nuts 14 and 15, held in sockets in the inner face of the bracket-plate, the arrangement being such that when the set-screws are screwed through the nuts by means of heads $15^a$, exposed on the outside of the bracket-plate, their inner ends engaging the bearing-plates will cause the bracket to be thrown outward at its upper end, as shown in Fig. 7, which will tip the cylindrical disk-bearing downward and correspondingly adjust the disk. It will be necessary in order to effect this adjustment to first loosen the two fastening-bolts 8 and 9, which may again be tightened up after the bearing has been adjusted by the screws 12 and 13.

By the lateral adjustment of the disks along their carrying-arms the width of the cut made by the disks may be varied, it being but necessary to shift the front and rear bearings with reference to the central one, which latter may be fixed as far as any lateral adjustment is concerned.

In order that the lateral disk-carrying arms may be firmly braced, so as to hold the disks to their work, I provide a brace-bar 16 for the forward arm $a^2$ and a brace-bar 17 for the arm $c^2$. The brace-bar 16 has its front end bearing against the rear face of arm $a^2$, to which it is secured by the fastening-bolt 9, the brace having a number of holes $16^a$ in its end to receive the fastening-bolt when the latter is changed in position on the arm to adjust the disk laterally. The opposite end of the brace-bar is fastened to the side of the draft portion of the frame member C by means of the bolt 2. The brace-bar 17 has its front end secured in like manner to the rear face of the disk-carrying arm $c^2$ and its opposite end firmly bolted to the draft portion of the frame member B.

The front furrow-wheel F, before alluded to, is mounted on a downwardly-inclined axle extending vertically in the form of a stem 20 and loosely through a casting or bracket 21, fixed to the upturned end of the transverse bar E. The stem has fixed to its upper end the inner forked end of an arm 22, whose opposite end is provided with a swiveling head 23, connected adjustably by a set-screw $23^a$ with the forward end of a rod 24, extending rearwardly and jointed to the side of a vertical hand-lever 25, which hand-lever is within easy reach of the driver, who occupies a seat 26 on the rear frame member B. The hand-lever is pivoted at its lower end to the side of a vertical standard 27, rising from the casting J, to which it is firmly fixed, and the lever is provided with a locking-dog engaging a toothed segment-plate 28 on the upper end of the standard. By means of this hand-lever 25 the driver is enabled to turn the front furrow-wheel in order to control the direction of travel of the machine, as in turning corners. The connection of the front end of the rod 24 with the arm 22 is adjustable in order to provide for the operative connection of the parts when the frame of the machine is shortened or lengthened in assembling the members of the same for carrying a greater or less number of disks.

The furrow-wheel is raised and lowered in order to raise and lower the front end of the frame by means of a hand-lever 30, pivoted at its lower end to the side of the vertical standard 27 and provided with a locking-dog engaging a toothed segment 31 on the upper end of the standard and alongside that just described. This lever has swiveled to its side a perforated head 32, through which the rear end of the rod 33 is loosely passed and secured by a set-screw 34, the forward end of said rod being jointed to one arm 35 of a bell-crank lever 36, pivoted, as at 36ª, to a rearwardly-extending arm 37 on the upper end of the bracket 21. The other arm 35ª on the bell-crank lever is connected, by means of vertical links 35ᵇ, with a sleeve 37ˣ, mounted loosely on the furrow-wheel stem between the forks of the arm 22, the arrangement being such that when the hand-lever 30 is pulled rearward the forward arm of the bell-crank will be drawn downward and will force the stem of the furrow-wheel F downward through the bracket-plate, and when the lever is pushed forward the stem of the furrow-wheel will be raised vertically, which actions will respectively raise and lower the forward end of the machine. A coiled spring 38 has its upper end connected with the sleeve 37ˣ and its lower end connected with the bracket 21 and tends to force the wheel downward and in this manner assists the operator in raising the front of the machine when the hand-lever is unlocked from its segment.

In order to convert the machine from a three-disk plow, as shown in Fig. 1, to a two-disk plow, as shown in Fig. 2, the intermediate frame member C is detached from the frame member in advance and from that in the rear by the removal of the fastening-bolts which secure said parts together, the brace-bar 16 being detached from the lateral arm a² and the brace-bar 17 being detached from lateral arm c². The frame member C is then removed and the draft portion of the member B is bolted to the draft portion of the forward member, the brace-bar 17 being bolted to the rear face of the disk-carrying arm a³ of the forward member. Previous to the disconnection of the parts in this manner the set-screws 23ª and 34 are loosened, so as to release the two rods 24 and 33, which connect the two hand-levers with the front furrow-wheel, and after the rear frame member is connected with the forward member and the swiveling heads have been slipped up along the rods the two set-screws are again tightened up and will secure the levers and rods again in operative relations.

To convert the machine into a one-disk plow, one of the disks is removed after the parts have been connected for a two-disk plow.

While I have illustrated and described the frame of the machine as being made up of complementary members of such a number as to carry three disks, it will be understood that additional frame members may be employed between the front and rear members, such additional members being substantially of the form of the intermediate member C.

The rear furrow-wheel K is mounted on a downwardly-inclined axle 40, extending laterally from the rear end of a horizontal axle-bar 41, having its opposite end turned upwardly to form a vertical stem 42, extending loosely through two bearing-lugs 43 and 44, projecting rearwardly from the block or casting J, with a space between the adjacent ends of said lugs. The stem 42 is encircled by a collar 45, which is situated between the two bearing-lugs and provided with a set-screw 46 for holding it firmly on the stem, the arrangement being such that the stem is capable of a swiveling motion in the bearings, but is prevented from moving up or down when the set-screw is tightened up and may be adjusted vertically and held in its different adjustments by sliding it through the collar and fastening the latter in place thereon. In the normal operation of the machine, as in plowing, this furrow-wheel travels at the side in the furrow, its motion furrowward being limited by a locking-latch 50, which permits the wheel to move landward when the machine is turned. This latch 50 is pivoted on a horizontal longitudinal axis, as at 51, to the casting J, and it is formed at one end with a nose 52, which when the plow is in action with the wheel traveling in the furrow engages the horizontal axle-bar and holds the wheel in the furrow, the latch being raised from engagement with the axle-bar when the machine is to be turned to the right.

In transporting the machine on roads or from field to field it is desirable that its rear end be raised much higher than when plowing, and in order to effect this result the nose of the latch 50 is formed with a cam-surface 54, adapted when the opposite end of the latch is raised by means of a handle 55 to engage the upper surface of the axle-bar and force the vertical stem downward through its bearings in the casting J, and thus elevate the frame of the machine, as shown in Fig. 5. It will be necesssary before this elevation of the frame by the latch to loosen the set-screw 46 so as to permit the stem to slide therethrough, which collar is again tightened on the stem to hold the frame elevated.

In order that the latch when in the position shown in Fig. 4, with the plow in action, may be maintained in this operative position, ready to catch the axle-bar as it comes back after the machine has turned to the right, I mount on the latch a movable locking-pin 56, the inner end of which is adapted to engage over a ledge 57 on the casting J and in this manner prevent the latch from tipping downward when the axle-bar moves landward from beneath it, the relation of the locking-pin, ledge, and latch being such that normally and while the plow is in action the latch will be held from resting on the crank-axle and a slight distance above it, with the nose of the latch extending downward alongside of the axle, so as to prevent the wheel from running out of the furrow, as shown in Fig. 9. When the latch is to be operated, as described, to elevate the frame of the machine, this locking-pin is first withdrawn free of the ledge to permit the nose-piece to be turned downward and to engage the axle-bar.

Having thus described my invention, what I claim is—

1. In a plow, a front frame member comprising the inclined body portion, a front transverse integral draft-arm extending landward from the body portion, and a rear integral disk-carrying arm extending furrowward from the body portion, in combination with a rear frame member formed with an inclined body portion, adapted to be fixed directly to the body portion of the front frame member, and having an integral disk-carrying arm extending furrowward in rear of the disk-carrying arm of the front member and parallel with the same.

2. In a wheeled plow, the combination with a front frame member having a landward-extending integral draft-arm, of a draft-tongue applied to said arm, a horizontal furrowward-extending bar connected with the tongue and having its free end upturned, and a front furrow-wheel sustained by the upturned end of said bar.

3. In a wheeled plow, the combination with the frame embodying a front frame member having a body portion, a landward-extending draft-arm, and a furrowward-extending disk-arm, of a tongue applied to the draft-arm, a bar fixed to the tongue and extending furrowward, a front furrow-wheel sustained by the bar, and a brace-rod connected respectively with said bar and with the body portion of the frame member.

4. In a plow the combination with a plurality of frame members, each comprising a draft portion adapted to be connected together one in advance of the other, and a lateral disk-carrying arm, a plurality of brace-bars each connected at its rear end with the draft portion of one member and at its forward end with the disk-carrying arm of the next member in advance.

5. In a plow and in combination with a disk-carrying member, a disk-bearing applied thereto, fastening devices for holding the bearing in place, and an adjusting device independent of the fastening devices and carried by and confined wholly on one of said parts and adapted to operatively engage the other and tilt the bearing when the fastening devices are released.

6. In a plow and in combination with a lateral disk-carrying arm, a disk-bearing applied thereto, fastening devices for holding the bearing in place on the arm, said fastening devices when released permitting the bearing to be tipped, a movable adjusting device carried by the bearing and independent of the fastening devices and adapted to operatively engage the arm and when actuated to tip the bearing.

7. In a plow and in combination with a disk-carrying arm, a disk-bearing applied thereto, an intermediate bearing-plate, a movable adjusting device carried by the disk-bearing and adapted to engage the bearing-plate, and means independent of the adjusting device for fastening the disk-bearing to the arm.

8. In a plow the combination with the horizontal disk-carrying arm, of a vertical bracket-plate applied thereto and carrying a disk-bearing, an intermediate vertical bearing-plate, a set-screw carried by the bracketing-plate and adapted to engage the upper end of the bearing-plate, and means for securing the bracket-plate to the arm.

9. In a plow the combination with the disk-carrying arm, of a disk-bearing applied thereto and formed in its face with a socket, a nut seated in the socket, a bearing-plate also seated in the socket, an adjusting-screw carried by the disk-bearing and threaded in the nut and adapted to engage the bearing-plate, and means for securing the disk-bearing to the carrying-arm.

10. In a plow the combination with the frame, of a swiveling furrow-wheel mounted therein, with relation to which the said frame is movable vertically, a latch carried by the frame and controlling the swiveling movement of the wheel, and means for actuating said latch to elevate the frame with reference to the wheel.

11. In a wheeled plow, the combination with the frame, of a vertical furrow-wheel stem mounted to swivel, and movable vertically with reference to the frame, and formed with a horizontal wheel-carrying arm, a furrow-wheel on said arm, and a lifting-lever carried by the frame and provided with a cam-surface adapted to engage the horizontal wheel-carrying arm and elevate the frame.

12. In a plow the combination with a frame, of a furrow-wheel axle formed with a horizontal portion, and with a vertical stem mounted slidingly in the frame and movable around a vertical axis, a furrow-wheel on the axle, a latch on the frame formed with a nose to engage and limit the swiveling motion of the axle, said latch being further formed with a cam-surface adapted to engage the axle-bar and elevate the frame.

13. In a plow the combination with the frame, of a swiveling furrow-wheel mounted therein and movable vertically with reference to the frame, a pivoted latch adapted when in one position to control the swiveling motion of the wheel, and formed when moved on its pivot to engage the wheel and elevate the frame.

14. In a wheeled plow, the combination, with the frame, of a vertically-movable furrow-wheel stem, a furrow-wheel applied to the lower end of the stem, a lateral arm fixed to the upper end of the stem, a lever mechanism operatively connected with said arm for turning the stem, a collar loosely encircling the stem and confined thereon by the arm, a lever mechanism sustained by the frame, and operatively connected with the collar, and acting to raise and lower the stem, and a lifting-spring connected at its upper end with said collar and at its lower end with the frame; whereby the stem may be turned by its operating mechanism, without causing the spring and lifting mechanism to be turned with it.

In testimony whereof I hereunto set my hand, this 6th day of December, 1904, in the presence of two attesting witnesses.

AUGUST LINDGREN.

Witnesses:
L. C. BLANDING,
C. H. LIPPINCOTT.